United States Patent
Horvay et al.

(10) Patent No.: US 11,847,861 B2
(45) Date of Patent: Dec. 19, 2023

(54) METHOD AND SYSTEM FOR PROVIDING SIGNATURE RECOGNITION AND ATTRIBUTION SERVICE FOR DIGITAL DOCUMENTS

(71) Applicant: JPMorgan Chase Bank, N.A., New York, NY (US)

(72) Inventors: Devin Horvay, Philadelphia, PA (US); Harsh Benara, Lincroft, NJ (US); Amit Lal, Princeton Junction, NJ (US); Ashish Sharma, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 63 days.

(21) Appl. No.: 17/450,736

(22) Filed: Oct. 13, 2021

(65) Prior Publication Data

US 2023/0115091 A1 Apr. 13, 2023

(51) Int. Cl.
| | |
|---|---|
| *G06V 10/82* | (2022.01) |
| *G06V 40/30* | (2022.01) |
| *G06V 10/94* | (2022.01) |
| *G06V 30/413* | (2022.01) |
| *G06V 30/414* | (2022.01) |
| *G06V 30/146* | (2022.01) |

(52) U.S. Cl.
CPC .......... *G06V 40/33* (2022.01); *G06V 10/95* (2022.01); *G06V 30/147* (2022.01); *G06V 30/413* (2022.01); *G06V 30/414* (2022.01)

(58) Field of Classification Search
CPC ...... G06V 40/33; G06V 10/25; G06V 30/413; G06V 10/95; G06V 30/414; G06V 30/147; G06V 10/82
See application file for complete search history.

(56) References Cited

U.S. PATENT DOCUMENTS

| | | | |
|---|---|---|---|
| 5,909,500 A  * | 6/1999 | Moore | G06V 40/30 |
| | | | 382/204 |
| 2019/0065822 A1* | 2/2019 | Hong | G06F 18/22 |
| 2020/0302208 A1* | 9/2020 | Hoehne | G06F 18/2413 |
| 2020/0372075 A1* | 11/2020 | Rogynskyy | H04L 51/48 |
| 2021/0073514 A1* | 3/2021 | Sangala | G06F 18/22 |
| 2021/0157975 A1* | 5/2021 | Gelosi | G06F 40/166 |
| 2022/0318559 A1* | 10/2022 | Shen | G06N 20/00 |

* cited by examiner

*Primary Examiner* — Syed Haider
(74) *Attorney, Agent, or Firm* — Greenblum & Bernstein, P.L.C.

(57) ABSTRACT

A method for extracting signatures and assigning signatory name attributions to the extracted signature images from unstructured digital documents is provided. The method includes: receiving a document that includes a signature; detecting a first region within the document in which the signature is present; applying a region-based convolutional neural network to the detected first region in order to demarcate a boundary that surrounds the detected first region; detecting a second region within the document in which a name that relates to the signature is present, by scanning the document to obtain a set of text words and then applying a named entity recognition (NER) machine learning algorithm to determine which text words are names; and assigning a signatory name attribution to the name that is present in the second region, based on a calculated distance between the name and the demarcated boundary.

14 Claims, 7 Drawing Sheets

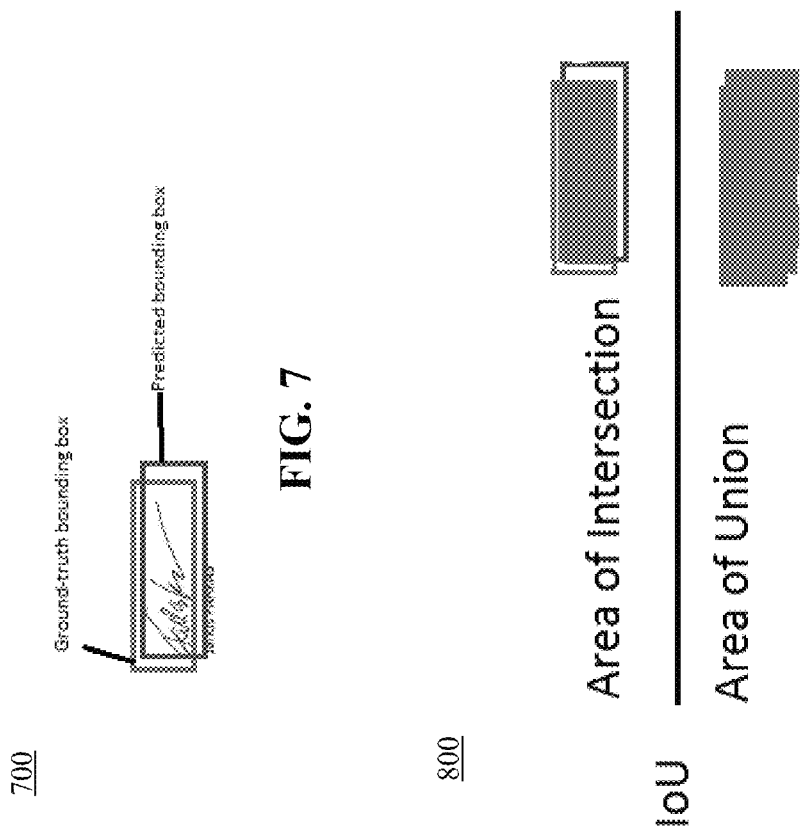

METHOD AND SYSTEM FOR PROVIDING SIGNATURE RECOGNITION AND ATTRIBUTION SERVICE FOR DIGITAL DOCUMENTS

BACKGROUND

1. Field of the Disclosure

This technology generally relates to methods and systems for extracting signatures and assigning signatory name attributions to the extracted signature images from unstructured digital documents.

2. Background Information

In many situations, a person may apply a signature to a document in order to indicate personal responsibility for information provided within the document. The signed document may then be transmitted or communicated to various destinations, and in many circumstances, such transmissions are performed via electronic means.

When such a document is received, there may be a need to extract a signature and to attribute the extracted signature to the name of the signatory. Conventionally, the process of extracting signatures and attributing signatures names thereto requires a manual check that is relatively time-consuming and of variable complexity. The complexity may be impacted by various factors, such as the language of the document, the quality of the document, and the fact that a signature may appear at any location on a page for some documents.

Accordingly, there is a need for an automated method for extracting signatures and assigning signatory name attributions to the extracted signature images from unstructured digital documents that is reliable and accurate.

SUMMARY

The present disclosure, through one or more of its various aspects, embodiments, and/or specific features or sub-components, provides, inter alia, various systems, servers, devices, methods, media, programs, and platforms for extracting signatures and assigning signatory name attributions to the extracted signature images from unstructured digital documents.

According to an aspect of the present disclosure, a method for extracting a signature and assigning a signatory name attribution is provided. The method is implemented by at least one processor. The method includes: receiving, by the at least one processor, a document that includes a signature; detecting, by the at least one processor, a first region within the document in which the signature is present; demarcating, by the at least one processor, a boundary that surrounds the detected first region; detecting, by the at least one processor, a second region within the document in which a name that relates to the signature is present; and assigning, by the at least one processor, a signatory name attribution to the name that is present in the second region.

The demarcating may include: identifying at least one region of interest from within the document; extracting, from each of the identified at least one region of interest, at least one respective feature of a potential signature; and applying a region-based convolutional neural network algorithm to each of the extracted at least one respective feature in order to output a bounding box that corresponds to the boundary.

The method may further include: as a result of the applying of the region-based convolutional neural network algorithm, outputting a respective set of bounding box coordinates and a respective label that indicates a classification of a content of the corresponding at least one region of interest.

The respective label may indicate that the content of the corresponding at least one region of interest includes at least one from among a signature, a name, a date, a stamp, and an image of an object.

The region-based convolutional neural network algorithm may be trained by using a plurality of sample images that contain signatures.

The region-based convolutional neural network algorithm may be evaluated by measuring an intersection-over-union (IoU) metric that indicates an accuracy of the outputted respective set of bounding box coordinates.

The detecting of the second region may include: scanning the document, and outputting a plurality of text words determined as being included in the document as a result of the scanning; generating, for each respective text word included in the document, a set of coordinates that indicates a corresponding location of the respective text word within the document; applying a named entity recognition (NER) machine learning algorithm to each respective text word in order to determine whether the respective text word is a name; and for each respective name, calculating a distance between the corresponding location thereof and the demarcated boundary.

The generating of each set of coordinates may include applying a hypertext markup language (HTML) optical character recognition (hOCR) algorithm to the document.

The applying of the signatory name attribution may include selecting the name that corresponds to the shortest calculated distance between the corresponding location thereof and the demarcated boundary.

According to another aspect of the present disclosure, a computing apparatus for extracting a signature and assigning a signatory name attribution is provided. The computing apparatus includes a processor; a memory; and a communication interface coupled to each of the processor and the memory. The processor is configured to: receive, via the communication interface, a document that includes a signature; detect a first region within the document in which the signature is present; demarcate a boundary that surrounds the detected first region; detect a second region within the document in which a name that relates to the signature is present; and assign a signatory name attribution to the name that is present in the second region.

The processor may be further configured to demarcate the boundary by: identifying at least one region of interest from within the document; extracting, from each of the identified at least one region of interest, at least one respective feature of a potential signature; and applying a region-based convolutional neural network algorithm to each of the extracted at least one respective feature in order to output a bounding box that corresponds to the boundary.

The processor may be further configured to: as a result of the application of the region-based convolutional neural network algorithm, output a respective set of bounding box coordinates and a respective label that indicates a classification of a content of the corresponding at least one region of interest.

The respective label may indicate that the content of the corresponding at least one region of interest includes at least one from among a signature, a name, a date, a stamp, and an image of an object.

The region-based convolutional neural network algorithm may be trained by using a plurality of sample images that contain signatures.

The region-based convolutional neural network algorithm may be evaluated by measuring an intersection-over-union (IoU) metric that indicates an accuracy of the outputted respective set of bounding box coordinates.

The processor may be further configured to detect the second region by: scanning the document, and outputting a plurality of text words determined as being included in the document as a result of the scanning; generating, for each respective text word included in the document, a set of coordinates that indicates a corresponding location of the respective text word within the document; applying a named entity recognition (NER) machine learning algorithm to each respective text word in order to determine whether the respective text word is a name; and for each respective name, calculating a distance between the corresponding location thereof and the demarcated boundary.

The processor may be further configured to generate each set of coordinates by applying a hypertext markup language (HTML) optical character recognition (hOCR) algorithm to the document.

The processor may be further configured to apply the signatory name attribution by selecting the name that corresponds to the shortest calculated distance between the corresponding location thereof and the demarcated boundary.

According to yet another exemplary embodiment, a non-transitory computer readable storage medium storing instructions for extracting a signature and assigning a signatory name attribution is provided. The storage medium includes executable code which, when executed by a processor, causes the processor to: receive a document that includes a signature; detect a first region within the document in which the signature is present; demarcate a boundary that surrounds the detected first region; detect a second region within the document in which a name that relates to the signature is present; and assign a signatory name attribution to the name that is present in the second region.

The executable code may be further configured to cause the processor to demarcate the boundary by: identifying at least one region of interest from within the document; extracting, from each of the identified at least one region of interest, at least one respective feature of a potential signature; and applying a region-based convolutional neural network algorithm to each of the extracted at least one respective feature in order to output a bounding box that corresponds to the boundary.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 is an illustration of a ground-truth bounding box and a predicted bounding box that are usable for evaluating a model that implements a method for extracting signatures and assigning signatory name attributions to the extracted signature images from unstructured digital documents, according to an exemplary embodiment.

FIG. 8 is an illustration of an Intersection over Union (IoU) metric that is usable for evaluating a model that implements a method for extracting signatures and assigning signatory name attributions to the extracted signature images from unstructured digital documents, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
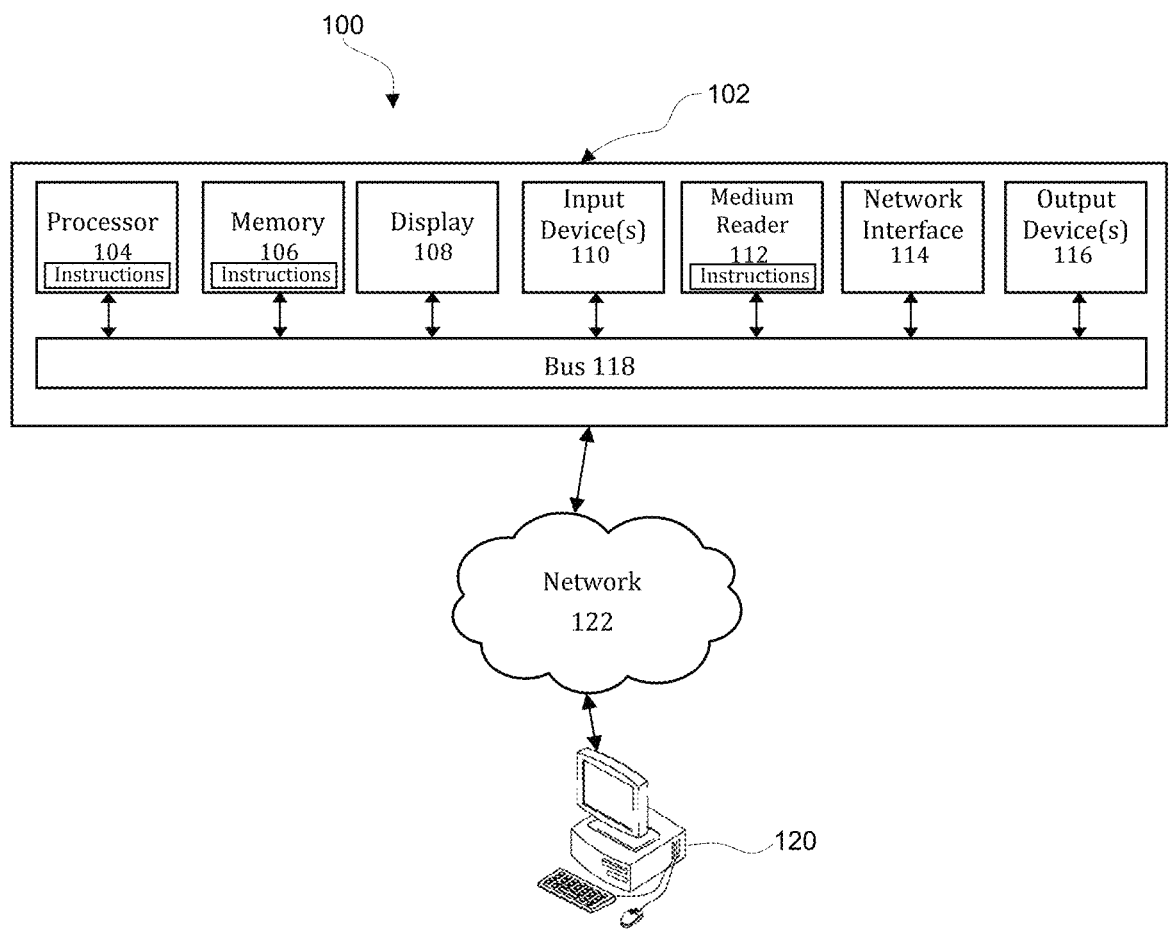
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for extracting signatures and assigning signatory name attributions to the extracted signature images from unstructured digital documents.

Figure 2:
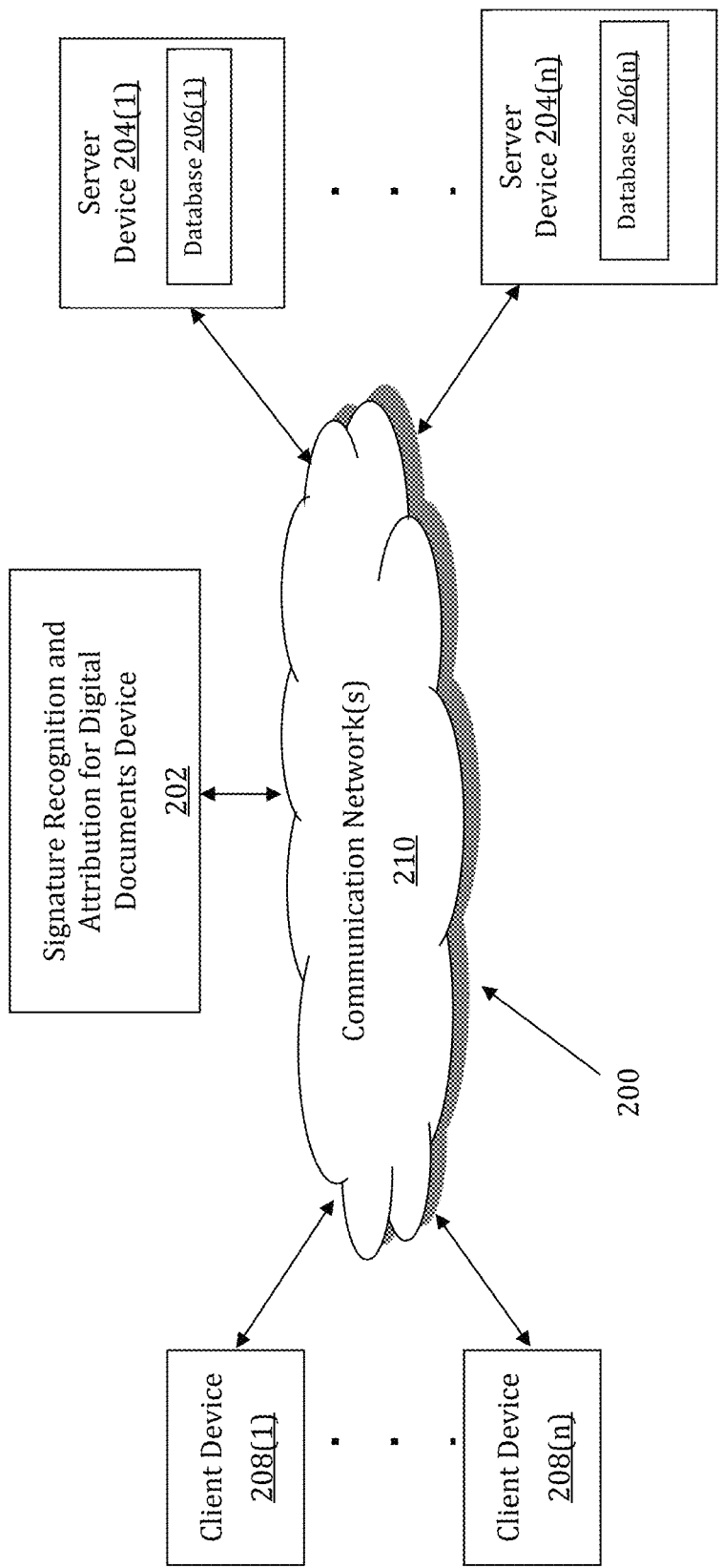
FIG. 2 illustrates an exemplary diagram of a network environment.

Referring to FIG. 2, a schematic of an exemplary network environment 200 for implementing a method for extracting signatures and assigning signatory name attributions to the extracted signature images from unstructured digital documents is illustrated. In an exemplary embodiment, the method is executable on any networked computer platform, such as, for example, a personal computer (PC).

The method for extracting signatures and assigning signatory name attributions to the extracted signature images from unstructured digital documents may be implemented by a Signature Recognition and Attribution for Digital Documents (SRADD) device 202. The SRADD device 202 may be the same or similar to the computer system 102 as described with respect to FIG. 1. The SRADD device 202 may store one or more applications that can include executable instructions that, when executed by the SRADD device 202, cause the SRADD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SRADD device 202 itself, may be located in virtual server(s) running in a cloud-based computing environment rather than being tied to one or more specific physical network computing devices. Also, the application(s) may be running in one or more virtual machines (VMs) executing on the SRADD device 202. Additionally, in one or more embodiments of this technology, virtual machine(s) running on the SRADD device 202 may be managed or supervised by a hypervisor.

In the network environment 200 of FIG. 2, the SRADD device 202 is coupled to a plurality of server devices 204(1)-204(n) that hosts a plurality of databases 206(1)-206(n), and also to a plurality of client devices 208(1)-208(n) via communication network(s) 210. A communication interface of the SRADD device 202, such as the network interface 114 of the computer system 102 of FIG. 1, operatively couples and communicates between the SRADD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SRADD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SRADD devices that efficiently implement a method for extracting signatures and assigning signatory name attributions to the extracted signature images from unstructured digital documents.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SRADD device 202 may be a standalone device or integrated with one or more other devices or apparatuses, such as one or more of the server devices 204(1)-204(n), for example. In one particular example, the SRADD device 202 may include or be hosted by one of the server devices 204(1)-204(n), and other arrangements are also possible. Moreover, one or more of the devices of the SRADD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SRADD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to signatures of persons and data that relates to document types.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SRADD device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SRADD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SRADD device 202, the server devices 208(1)-208(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SRADD device 202, the server devices 204(1)-204(n), or the client devices 208(1)-208(n), for example, may be configured to operate as virtual instances on the same physical machine. In other words, one or more of the SRADD device 202, the server devices 204(1)-204(n), or the client devices 208(1)-208(n) may operate on the same physical device rather than as separate devices communicating through communication network(s) 210. Additionally, there may be more or fewer SRADD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
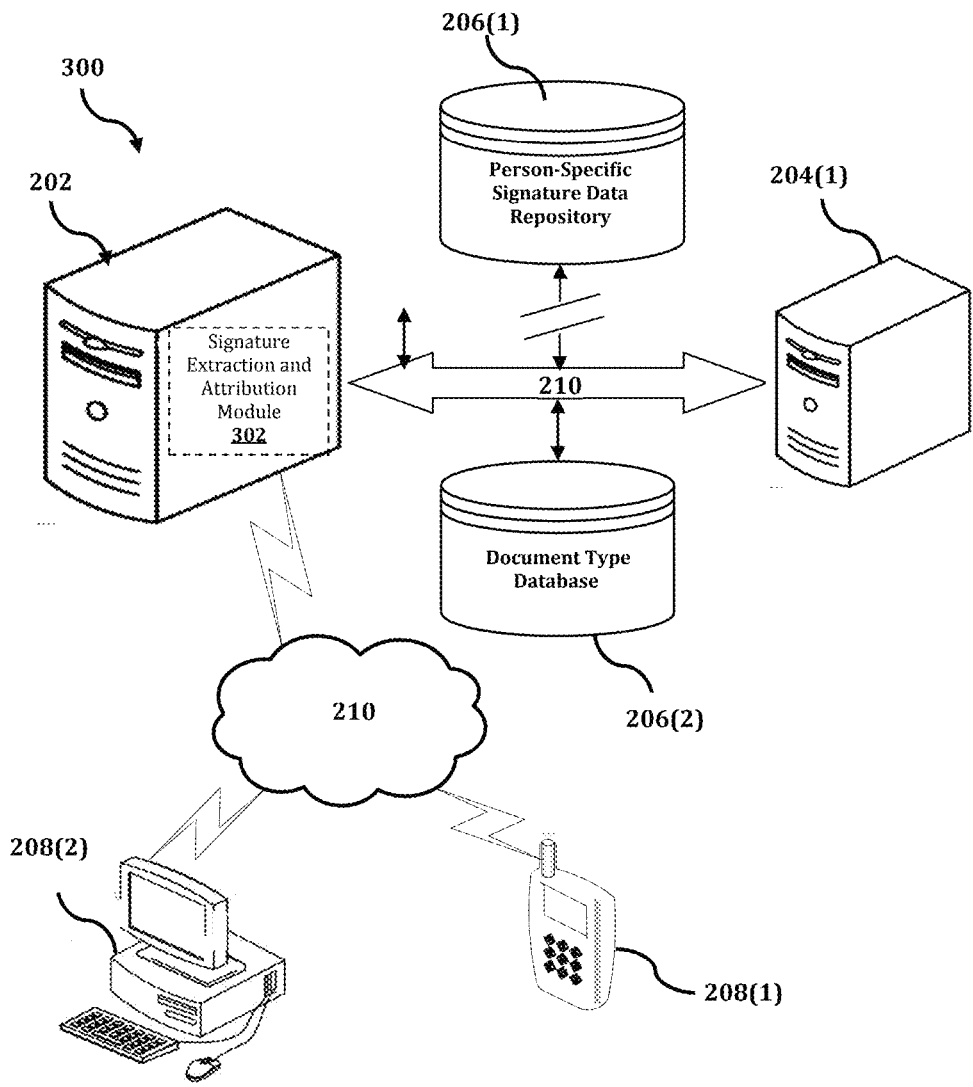
FIG. 3 shows an exemplary system for implementing a method for extracting signatures and assigning signatory name attributions to the extracted signature images from unstructured digital documents.

The SRADD device 202 is described and illustrated in FIG. 3 as including a signature extraction and attribution module 302, although it may include other rules, policies, modules, databases, or applications, for example. As will be described below, the signature extraction and attribution module 302 is configured to implement a method for extracting signatures and assigning signatory name attributions to the extracted signature images from unstructured digital documents.

An exemplary process 300 for implementing a mechanism for extracting signatures and assigning signatory name attributions to the extracted signature images from unstructured digital documents by utilizing the network environment of FIG. 2 is illustrated as being executed in FIG. 3. Specifically, a first client device 208(1) and a second client device 208(2) are illustrated as being in communication with SRADD device 202. In this regard, the first client device 208(1) and the second client device 208(2) may be "clients" of the SRADD device 202 and are described herein as such. Nevertheless, it is to be known and understood that the first client device 208(1) and/or the second client device 208(2) need not necessarily be "clients" of the SRADD device 202, or any entity described in association therewith herein. Any additional or alternative relationship may exist between either or both of the first client device 208(1) and the second client device 208(2) and the SRADD device 202, or no relationship may exist.

Further, SRADD device 202 is illustrated as being able to access a person-specific signature data repository 206(1) and a document type database 206(2). The signature extraction and attribution module 302 may be configured to access these databases for implementing a method for extracting signatures and assigning signatory name attributions to the extracted signature images from unstructured digital documents.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SRADD device 202 via broadband or cellular communication. Of course, these embodiments are merely exemplary and are not limiting or exhaustive.

Upon being started, the signature extraction and attribution module 302 executes a process for extracting signatures and assigning signatory name attributions to the extracted signature images from unstructured digital documents. An exemplary process for extracting signatures and assigning signatory name attributions to the extracted signature images from unstructured digital documents is generally indicated at flowchart 400 in FIG. 4.

Figure 4:
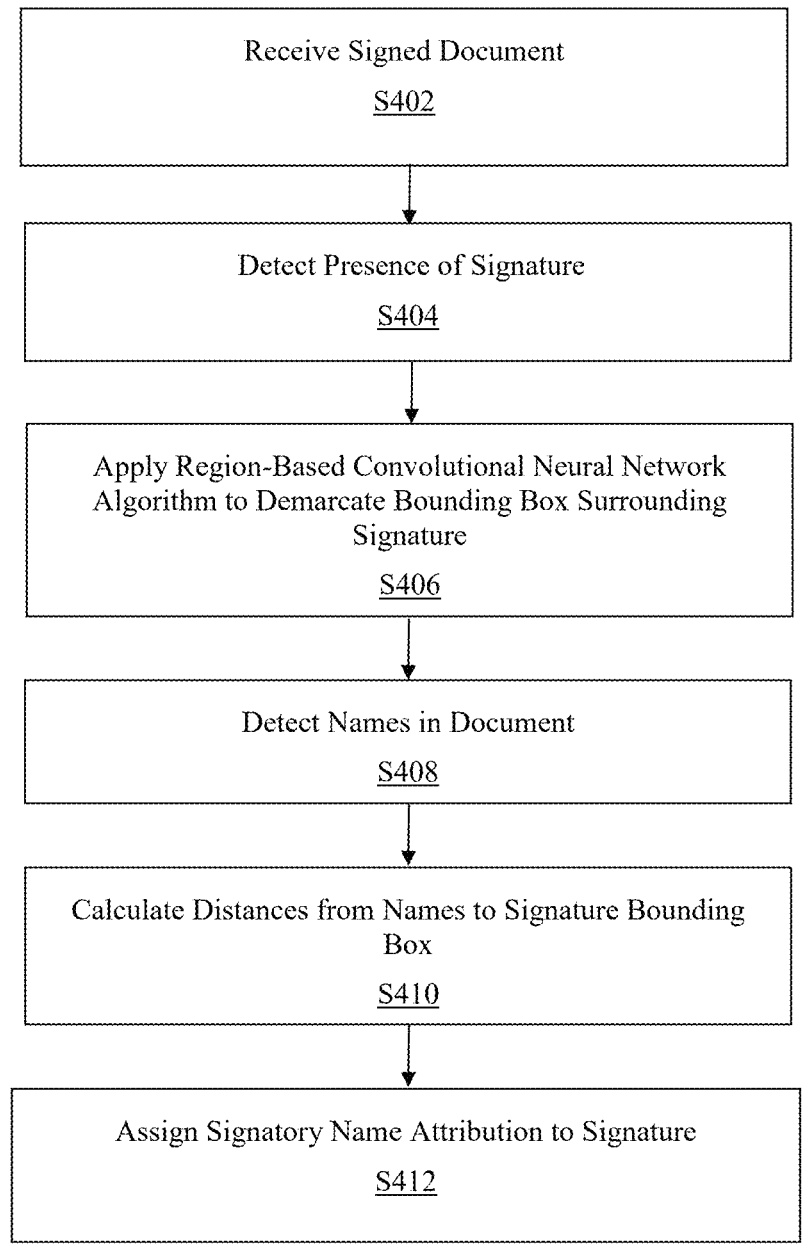
FIG. 4 is a flowchart of an exemplary process for implementing a method for extracting signatures and assigning signatory name attributions to the extracted signature images from unstructured digital documents.

In process 400 of FIG. 4, at step S402, the signature extraction and attribution module 302 receives a document that includes at least one signature. In an exemplary embodiment, the document is an unstructured digital document that may be of any type that is capable of being scanned and/or processed electronically.

At step S404, the signature extraction and attribution module 302 detects a region within the document in which the signature is present. Then, at step S406, the signature extraction and attribution module 302 demarcates a boundary that surrounds the detected signature. In an exemplary embodiment, the detecting of the signature and the demarcating of the boundary may be performed by 1) identifying a region of interest from within the document; 2) extracting one or more features of a potential signature from the region of interest; and 3) applying a region-based convolutional neural network algorithm to the extracted features in order to output a bounding box that corresponds to the demarcated boundary.

At step S408, the signature extraction and attribution module 302 detects one or more names that are included in the document. In an exemplary embodiment, the detecting of the names may be performed by 1) scanning the document and outputting text words that are determined as being included in the document as a result of the scanning; 2) for each outputted text word, generating a set of coordinates that indicates a corresponding location of the respective text word within the document; and 3) applying a named entity recognition (NER) machine learning algorithm to each respective text word in order to determine whether the respective text word is a name.

At step S410, the signature extraction and attribution module 302 calculates, for each respective name, a distance between its location and the demarcated boundary of the signature. Then, at step S412, the signature extraction and attribution module 302 assigns a signatory name attribution to the signature. In an exemplary embodiment, the assigning of the signatory name attribution is based on the calculated distances between the signature and the names included in the document, i.e., the name that is closest to the signature is attributed to the signature.

In an exemplary embodiment, a Signature as a Service (SaaS) may include several capabilities. A barcode reading functionality is designed to be fast and accurate, but limited to a relatively small number of document types, as the bar codes are generally added at composition. An optical mark recognition (OMR) functionality is designed to convert written marks in data fields, such as yes/no answers. The OMR functionality is commonly used on surveys, applications, school tests, and other forms that include data fields. The OMR functionality is also designed identify the presence of signatures.

An optical character recognition (OCR) functionality recognizes printed text. This is now a mature technology and typically provides high accuracy on Latin-based characters, and is still being optimized for some Asian languages. An intelligent character recognition (ICR) functionality, also referred to herein as a handprint recognition functionality, is a relatively newer and less accurate technology.

In an exemplary embodiment, the SaaS also includes a signature recognition and attribution service, which implements several functionalities: 1) Accept an image that contains one or more signatures; 2) detect and give attribution for signatories; 3) invoke signature extraction; and 4) persist extracted signatures.

Overview of object recognition techniques: Object recognition is a general term that refers to a collection of related computer vision tasks that involve identifying objects in digital images. Object recognition includes three computer vision tasks: 1) Classification, which entails making a prediction of a type or class of an object included an image (e.g. signature, stamp, date, cat, etc.). For the classification task, the input is an image that includes an object, and the output is a class label. 2) Localization, which entails locating the presence of objects in images and indicating their locations with bounding boxes. For the localization task, the input is an image with one or more objects, and the output is one or more bounding boxes. 3) Detection, which entails locating the presence of objects with a bounding box and determining types or classes of the located objects in an image. For the detection task, the input is an image with one or more objects, and the output is one or more bounding boxes, together with class labels for each box.

Region-based Convolution Neural Networks (R-CNNs): The following is a set of definitions for related terms: 1) Machine Learning is a subfield of artificial intelligence based on statistics, and involves machines learning how to complete tasks without being explicitly programmed to do so. Machine learning techniques use existing data to learn a function that can make a prediction when given new data.

2) Neural Network, also referred to as artificial neural network (ANN) or simulated neural network (SNN), is an interconnected group of natural or artificial neurons that uses a mathematical or computational model for information processing based on a connectionist approach to computation. In most cases, an ANN is an adaptive system that changes its structure based on external or internal information that flows through the network. In more practical terms, neural networks are non-linear statistical data modeling or decision making tools. They can be used to model complex relationships between inputs and outputs or to find patterns in data.

3) Deep Learning is part of a broader family of machine learning methods based on artificial neural networks with representation learning. 4) Convolutional Neural Network is a class of deep neural networks, most commonly applied to analyzing visual imagery.

Region-based Convolutional Neural Networks (R-CNN) includes two steps. First, using selective search, it identifies a manageable number of bounding-box object region candidates ("region of interest" or "RoI"). And then it extracts CNN features from each region independently for classification.

R-CNN model workflow: 1) Pre-train a convolutional neural network on an image classification task. The classification task involves N classes. 2) Propose category-independent regions of interest by selective search. In an exemplary embodiment, a typical image may include up to approximately 2000 candidate regions of interest. These regions may contain target objects and they may be of different sizes. 3) Region candidates are warped so as to have a fixed size as required by the convolutional neural network. 4) Continue fine-tuning the convolutional neural network on warped proposal regions for K+1 classes. The additional one class refers to the background (i.e., no object of interest) in the fine-tuning stage, a much smaller learning rate may be used and the mini-batch oversamples the positive cases, because most proposed regions are, just background. 5) Given every image region, one forward propagation through the convolutional neural network generates a feature vector. This feature vector is then consumed by a binary support vector machine (SVM) which is trained for each class independently. In an exemplary embodiment, the positive samples are proposed regions with an intersection over union (IoU) overlap threshold that is greater than or equal to 0.3, and negative samples are irrelevant. 6) To reduce the localization errors, a regression model is trained to correct the predicted detection window on a bounding box correction offset using CNN features.

Figure 5:
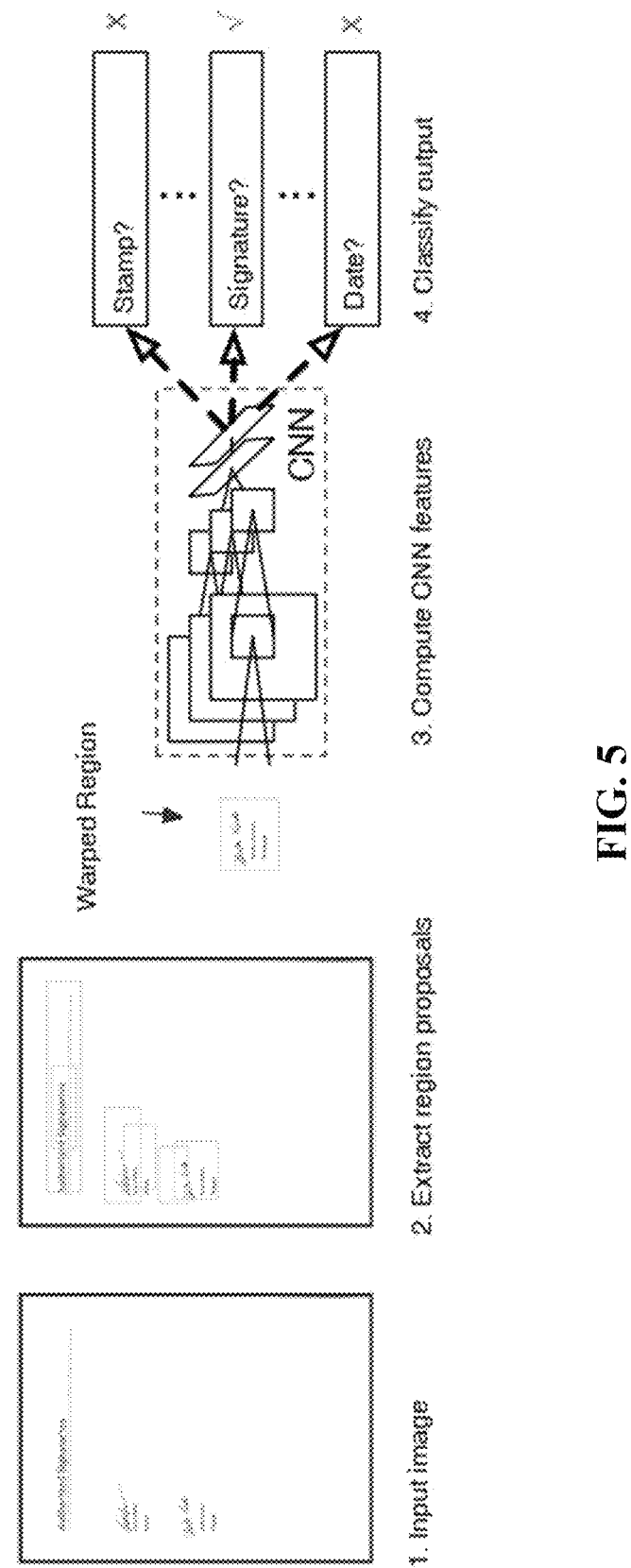
FIG. 5 is a diagram that illustrates operations performed by a region-based convolutional neural network in the performance of a method for extracting signatures and assigning signatory name attributions to the extracted signature images from unstructured digital documents, according to an exemplary embodiment.

FIG. 5 is a diagram 500 that illustrates operations performed by a region-based convolutional neural network in the performance of a method for extracting signatures and assigning signatory name attributions to the extracted signature images from unstructured digital documents, according to an exemplary embodiment. As illustrated in FIG. 5, in a first operation, an image is provided as an input; and in a second operation, several candidate regions of interest are proposed, as indicated by the rectangular sections shown in the second part of diagram 500. In a third operation, the candidate regions are warped in order to ensure conformance with size requirements, and then the convolutional neural network algorithm computes features of each candidate region. Finally, in a fourth operation, each region is classified with a label that is determined based on the features computed in the third operation.

Figure 6:
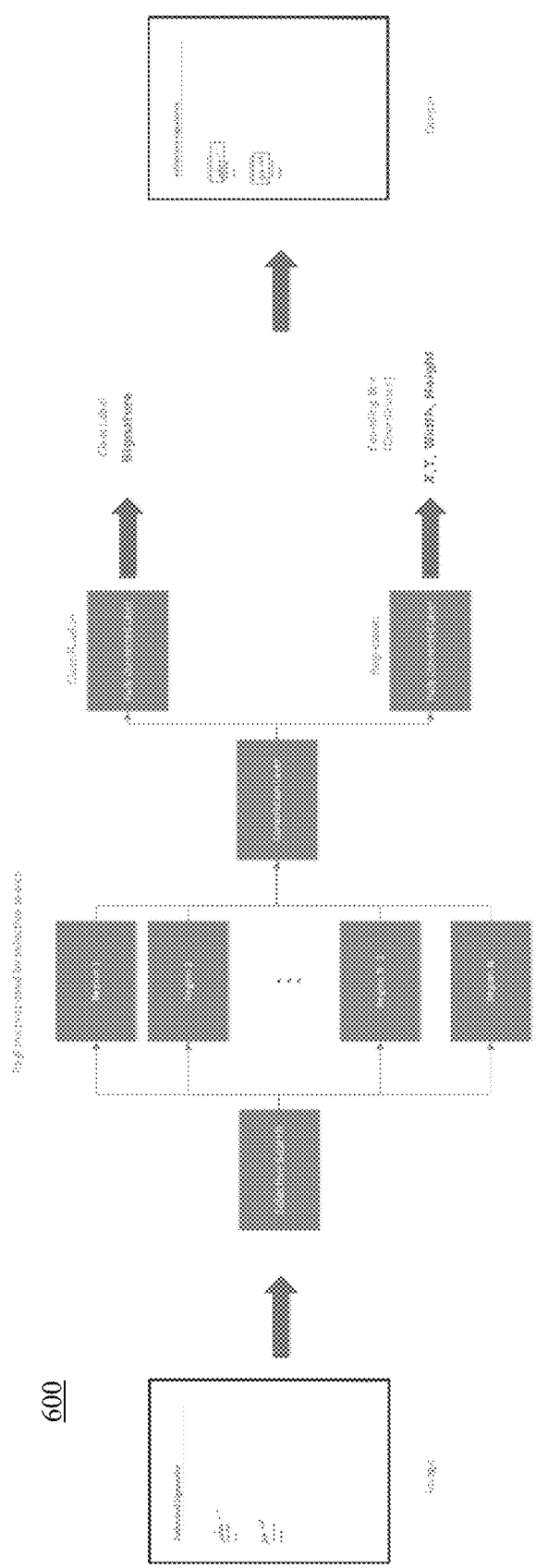
FIG. 6 is a diagram that illustrates an architecture of a signature recognition operation performed as part of a method for extracting signatures and assigning signatory name attributions to the extracted signature images from unstructured digital documents, according to an exemplary embodiment.

Signature Recognition Component: FIG. 6 is a diagram 600 that illustrates an architecture of a signature recognition operation performed as part of a method for extracting signatures and assigning signatory name attributions to the extracted signature images from unstructured digital documents, according to an exemplary embodiment.

As shown in FIG. 6, an image that includes a signature is inputted into the R-CNN machine learning model, a selective search is performed in order to identify proposed candidate regions, the candidate regions are processed by the convolutional neural network, and class label and bounding box coordinates are outputted. The rightmost result is a projection of class label and bounding box on the original image.

Model Setup and Training: In an exemplary embodiment, an analyst using the model procures a reasonable number n of sample images containing signatures, such as an n greater than 300. These documents are then converted from a PDF file format to a PNG file format using a script. The analyst then can use annotation tools to draw bounding boxes around the signatures and add the appropriate class label. The dataset is then partitioned 9:1, i.e., 90 percent of the images are used for training the model and 10 percent of the images are used for validation. A parameterized training pipeline may be defined by using an object detection library. The training job is then commenced, and the results are monitored.

Model Evaluation: For evaluation, an Intersection over Union (IoU) approach is used. Intersection over Union is a metric used to measure the accuracy of an object detector on a particular dataset. Using the ground-truth bounding boxes, which are derived from the training set and labeled by a data scientist, and the predicted bounding box, which is created by the R-CNN model, the algorithm can be applied.

FIG. 7 is an illustration 700 of a ground-truth bounding box and a predicted bounding box that are usable for evaluating a model that implements a method for extracting signatures and assigning signatory name attributions to the extracted signature images from unstructured digital documents, according to an exemplary embodiment. FIG. 8 is an illustration 800 of an Intersection over Union (IoU) metric that is usable for evaluating a model that implements a method for extracting signatures and assigning signatory name attributions to the extracted signature images from unstructured digital documents, according to an exemplary embodiment.

Referring to FIG. 7 and FIG. 8, a computation of Intersection over Union is illustrated as a ratio of two areas. Examining the equation illustrated in FIG. 8, it may be seen that Intersection over Union is simply a ratio. The numerator is the area of intersection between the predicted bounding box and the ground-truth bounding box. The denominator is the area of union between the two bounding boxes, or more simply, the area encompassed by both the predicted bounding box and the ground-truth bounding box. Dividing the area of overlap by the area of union yields the final score, i.e., the Intersection over Union metric.

Due to varying parameters of the model, a complete and total match between predicted and ground-truth bounding boxes is simply unrealistic. Because of this, it is important to define an evaluation metric that rewards predicted bounding boxes for heavily overlapping with the ground-truth.

Signature Attribution: Once a signature image bounding box has been defined, the next step is to attribute that image to a name. To do this, the bounding box for the name must be found, and working under the assumption that the image and name will appear together on the document, the distance therebetween may be determined using geometry. For multiple signatories, the shortest distance between images and name will be used for attribution.

In an exemplary embodiment, the signature attribution uses a Hypertext Markup Language (HTML) optical character recognition (hOCR) service. The hOCR service refers to an open standard of data representation for formatted text obtained from optical character recognition (OCR). The definition encodes text, style, layout information, recognition confidence metrics and other information using Extensible Markup Language (XML) in the form of Hypertext Markup Language (HTML) or XHTML.

Named-entity recognition (NER) is a subtask of information extraction that seeks to locate and classify named entities mentioned in unstructured text into pre-defined categories, such as person names, organizations, locations, medical codes, time expressions, quantities, monetary values, percentages, and/or any other suitable category type. In an exemplary embodiment, an NER functionality may be structured as taking an unannotated block of text, such as this one: "Jim bought 300 shares of Acme Corp. in 2006," and then producing an annotated block of text that highlights the names of entities, as follows: "[Jim]$_{Person}$ bought 300 shares of [Acme Corp.]$_{Organization}$ in [2006]$_{Time}$." In this example, a person name consisting of one token, a two-token company name and a temporal expression have been detected and classified. Thus, in an exemplary embodiment, by using an NER service, signatory names may be extracted from text.

Distance Algorithm: In an exemplary embodiment, after the signatory name and bounding box plus the signature bounding box have been obtained, a distance therebetween may be calculated by using the Euclidean Distance algorithm, which finds the minimum distance between points in two-dimensional space. The Euclidean Distance algorithm may be expressed as follows:

$$d(x, y) = \sqrt{\sum_{i=1}^{n} (y_i - x_i)^2}$$

The Euclidean Distance algorithm iteratively through all pairs of signature bounding boxes and signatory names and bounding boxes. As part of this algorithm, orphan named-entities/signature images may also be resolved. In an exemplary embodiment, a determination may also be made as to how signatures are organized on the page if names are below/above the signature, arranged in a table, and/or in any other particular format. This algorithm operates on the assumption that names are located close to their signature on the document, which appears to generally hold true for sample images.

Signature Validation User Interface: In an exemplary embodiment, after processing, a feedback mechanism may be available to enable users to validate what has been extracted by the machine learning algorithm. This user interface (UI) may contain the signatory name, signature, and confidence levels, along with an Image Viewer for easy cross-reference. Users may be able to give options why a signature is incorrect (e.g., "Signatory Name wrong," or "Signatory Specimen wrong"), together with an option to provide new coordinates and/or recapture of the signature.

Accordingly, with this technology, an optimized process for extracting signatures and assigning signatory name attributions to the extracted signature images from unstructured digital documents is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for extracting a signature and assigning a signatory name attribution, the method being implemented by at least one processor, the method comprising:
   receiving, by the at least one processor, a document that includes a signature;
   detecting, by the at least one processor, a first region within the document in which the signature is present;
   demarcating, by the at least one processor, a boundary that surrounds the detected first region, wherein the demarcating comprises evaluating a region-based convolutional neural network algorithm by measuring an intersection-over-union (IoU) metric that indicates an accuracy of the outputted respective set of bounding box coordinates, wherein the IoU metric of an accurate coordinate is at least 0.3 and the IoU metric of an inaccurate coordinate is less than 0.3;
   detecting, by the at least one processor, a second region within the document in which a name that relates to the signature is present, wherein the detecting of the second region comprises:
      scanning the document, and outputting a plurality of text words determined as being included in the document as a result of the scanning;
      generating, for each respective text word included in the document, a set of coordinates that indicates a corresponding location of the respective text word within the document, wherein the generating of each set of coordinates comprises applying a hypertext markup language (HTML) optical character recognition (hOCR) algorithm to the document;
      applying a named entity recognition (NER) machine learning algorithm to each respective text word in order to determine whether the respective text word is a name, wherein the applying of the signatory name attribution comprises selecting the name that corresponds to the shortest calculated distance between the corresponding location thereof and the demarcated boundary; and
      for each respective name, calculating a distance between the corresponding location thereof and the demarcated boundary; and
   assigning, by the at least one processor, a signatory name attribution to the name that is present in the second region.

2. The method of claim 1, wherein the demarcating further comprises:
   identifying at least one region of interest from within the document;
   extracting, from each of the identified at least one region of interest, at least one respective feature of a potential signature; and
   applying the region-based convolutional neural network algorithm to each of the extracted at least one respective feature in order to output a bounding box that corresponds to the boundary.

3. The method of claim 2, further comprising:
   as a result of the applying of the region-based convolutional neural network algorithm, outputting a respective set of bounding box coordinates and a respective label that indicates a classification of a content of the corresponding at least one region of interest.

4. The method of claim 3, wherein the respective label indicates that the content of the corresponding at least one region of interest includes at least one from among a signature, a name, a date, a stamp, and an image of an object.

5. The method of claim 3, wherein the region-based convolutional neural network algorithm is trained by using a plurality of sample images that contain signatures.

6. A computing apparatus for extracting a signature and assigning a signatory name attribution, the computing apparatus comprising:
   a processor;
   a memory; and
   a communication interface coupled to each of the processor and the memory,
   wherein the processor is configured to:
      receive, via the communication interface, a document that includes a signature;
      detect a first region within the document in which the signature is present;
      demarcate a boundary that surrounds the detected first region, wherein the demarcating comprises evaluating a region-based convolutional neural network algorithm by measuring an intersection-over-union (IoU) metric that indicates an accuracy of the outputted respective set of bounding box coordinates, wherein the IoU metric of an accurate coordinate is at least 0.3 and the IoU metric of an inaccurate coordinate is less than 0.3;
      detect a second region within the document in which a name that relates to the signature is present, wherein the processor is further configured to detect the second region by:
         scanning the document, and outputting a plurality of text words determined as being included in the document as a result of the scanning;
         generating, for each respective text word included in the document, a set of coordinates that indicates a corresponding location of the respective text word within the document, wherein the generating of each set of coordinates comprises applying a hypertext markup language (HTML) optical character recognition (hOCR) algorithm to the document;

applying a named entity recognition (NER) machine learning algorithm to each respective text word in order to determine whether the respective text word is a name, wherein the applying of the signatory name attribution comprises selecting the name that corresponds to the shortest calculated distance between the corresponding location thereof and the demarcated boundary; and for each respective name, calculating a distance between the corresponding location thereof and the demarcated boundary; and assign a signatory name attribution to the name that is present in the second region.

7. The computing apparatus of claim 6, wherein the processor is further configured to demarcate the boundary by:

identifying at least one region of interest from within the document;

extracting, from each of the identified at least one region of interest, at least one respective feature of a potential signature; and applying the region-based convolutional neural network algorithm to each of the extracted at least one respective feature in order to output a bounding box that corresponds to the boundary.

8. The computing apparatus of claim 7, wherein the processor is further configured to:

as a result of the application of the region-based convolutional neural network algorithm, output a respective set of bounding box coordinates and a respective label that indicates a classification of a content of the corresponding at least one region of interest.

9. The computing apparatus of claim 8, wherein the respective label indicates that the content of the corresponding at least one region of interest includes at least one from among a signature, a name, a date, a stamp, and an image of an object.

10. The computing apparatus of claim 8, wherein the region-based convolutional neural network algorithm is trained by using a plurality of sample images that contain signatures.

11. A non-transitory computer readable storage medium storing instructions for extracting a signature and assigning a signatory name attribution, the storage medium comprising executable code which, when executed by a processor, causes the processor to:

receive a document that includes a signature;

detect a first region within the document in which the signature is present;

demarcate a boundary that surrounds the detected first region, wherein the demarcating comprises evaluating a region-based convolutional neural network algorithm by measuring an intersection-over-union (IoU) metric that indicates an accuracy of the outputted respective set of bounding box coordinates, wherein the IoU metric of an accurate coordinate is at least 0.3 and the IoU metric of an inaccurate coordinate is less than 0.3;

detect a second region within the document in which a name that relates to the signature is present, wherein the processor is further configured to detect the second region by:

scanning the document, and outputting a plurality of text words determined as being included in the document as a result of the scanning;

generating, for each respective text word included in the document, a set of coordinates that indicates a corresponding location of the respective text word within the document, wherein the processor is further configured to generate each set of coordinates by applying a hypertext markup language (HTML) optical character recognition (hOCR) algorithm to the document;

applying a named entity recognition (NER) machine learning algorithm to each respective text word in order to determine whether the respective text word is a name, wherein the applying of the signatory name attribution comprises selecting the name that corresponds to the shortest calculated distance between the corresponding location thereof and the demarcated boundary; and for each respective name, calculating a distance between the corresponding location thereof and the demarcated boundary; and assign a signatory name attribution to the name that is present in the second region.

12. The storage medium of claim 11, wherein the executable code is further configured to cause the processor to demarcate the boundary by:

identifying at least one region of interest from within the document;

extracting, from each of the identified at least one region of interest, at least one respective feature of a potential signature; and applying the region-based convolutional neural network algorithm to each of the extracted at least one respective feature in order to output a bounding box that corresponds to the boundary.

13. The method of claim 3, wherein the detecting the second region comprises determining, based on a calculated geometric distance, that the second region comprises an identified name that is geometrically located closer to the first region than is any other location of one or more names that have been identified within the document.

14. The computing apparatus of claim 6, wherein the detecting the second region comprises determining, based on a calculated geometric distance, that the second region comprises an identified name that is geometrically located closer to the first region than is any other location of one or more names that have been identified within the document.

* * * * *